United States Patent [19]
dal Molin

[11] 3,783,233
[45] Jan. 1, 1974

[54] WELDING GUN COOLING STRUCTURE AND ELECTRODE TIP RETAINER

[75] Inventor: Guido A. dal Molin, Westlake, Ohio

[73] Assignee: Co-Ordinated Industries, Inc., Aliquippa, Pa.

[22] Filed: July 14, 1971

[21] Appl. No.: 162,678

Related U.S. Application Data

[60] Division of Ser. No. 10,389, Feb. 11, 1970, Pat. No. 3,610,875, which is a continuation-in-part of Ser. No. 672,794, Oct. 4, 1967, Pat. No. 3,544,758.

[52] U.S. Cl. ............... 219/130, 219/74, 219/136
[51] Int. Cl. ....................................... B23k 9/00
[58] Field of Search ............ 219/136, 130, 74, 219/75

[56] References Cited
UNITED STATES PATENTS

| | | | |
|---|---|---|---|
| 3,596,049 | 7/1971 | Ogden | 219/136 X |
| 3,433,882 | 3/1969 | Henriksen et al. | 219/136 X |
| 3,629,547 | 12/1971 | Kester | 219/136 X |
| 3,253,116 | 5/1966 | Kensrue | 219/130 |
| 3,541,298 | 11/1970 | Carkhuff | 219/130 |
| 2,347,646 | 5/1944 | Smith | 219/136 |
| 3,469,070 | 9/1969 | Bernard et al. | 219/130 |
| 3,155,811 | 11/1964 | Adamson et al. | 219/130 |

*Primary Examiner*—R. F. Staubly
*Assistant Examiner*—George A. Montanye
*Attorney*—Bosworth, Sessions, Herrstrom & Cain

[57] ABSTRACT

A welding gun and cable apparatus utilizing quick connect and disconnect couplings to provide electrical current and shielding gas to a welding gun as well as a welding electrode if desired. The welding gun includes an elongate body having a gas passage and a passage formed between the body and an outer covering through which air flows by connection to cool the body. Additionally the gas passage may also contain a liner with radially sprung fingers at one end to outwardly bias against a welding tip to retain the welding tip in a nozzle portion.

7 Claims, 12 Drawing Figures

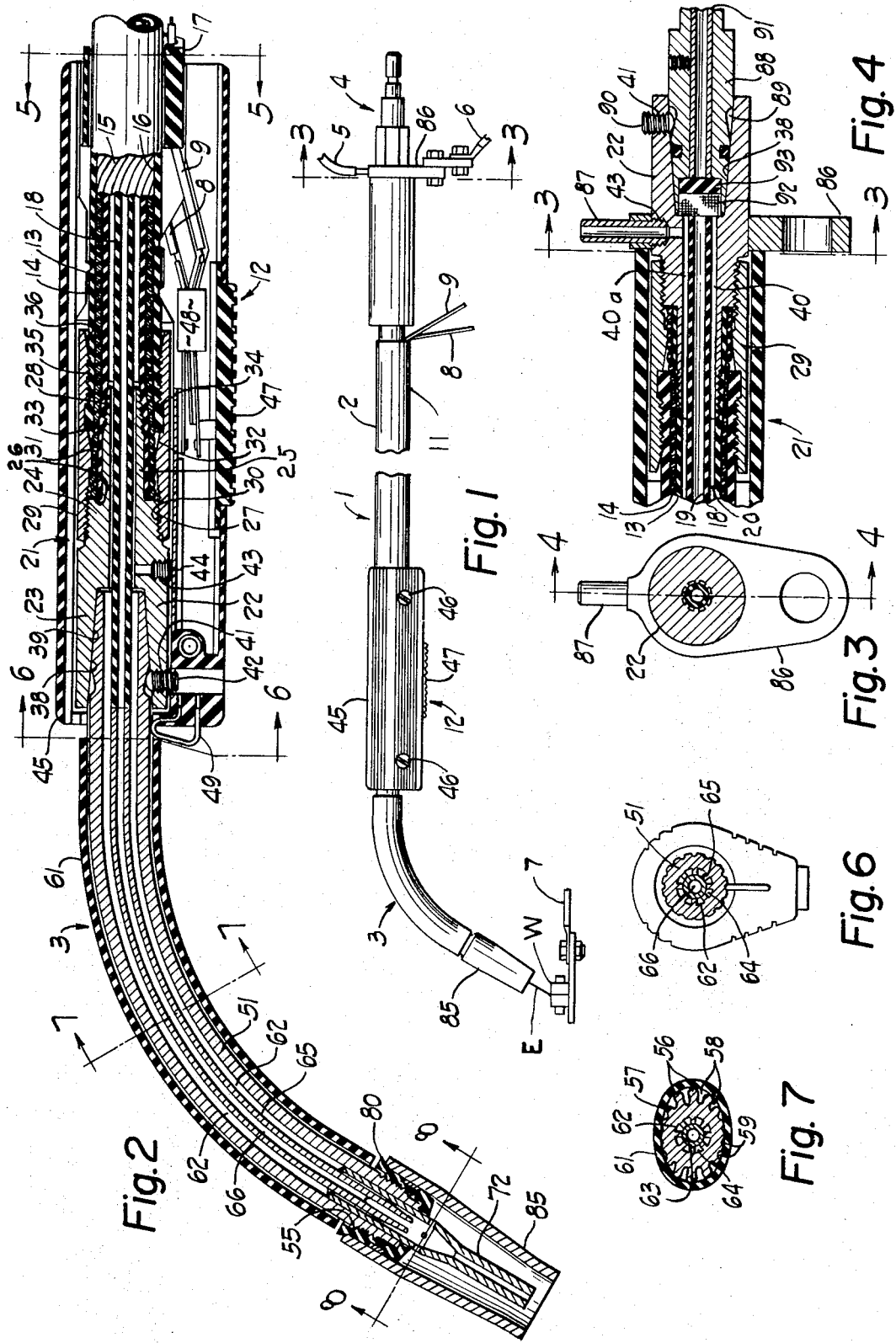

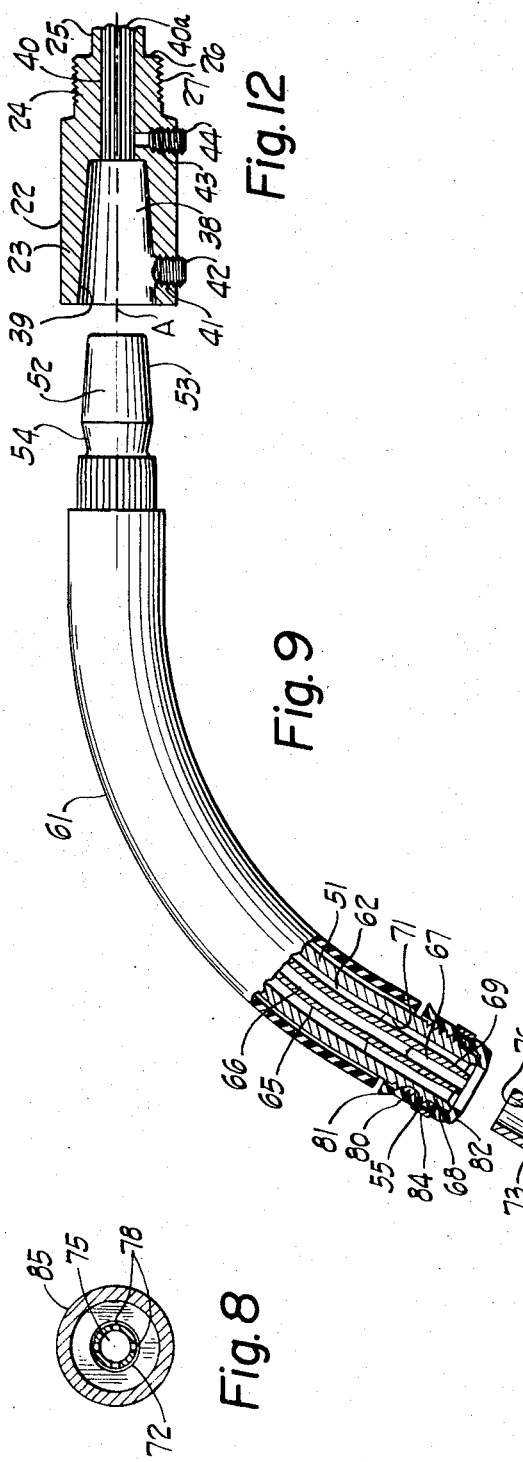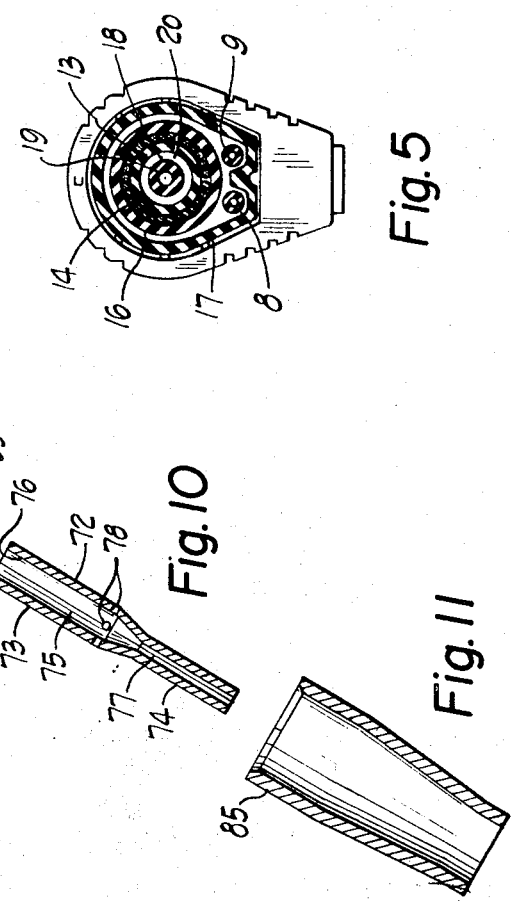

WELDING GUN COOLING STRUCTURE AND ELECTRODE TIP RETAINER

CROSS REFERENCE TO RELATED APPLICATIONS

This application is a division of application Ser. No. 10,389 filed Feb. 11, 1970 now U.S. Pat. No. 3,610,875 dated Oct. 5, 1971, which is a continuation-in-part of application Ser. No. 672,794, filed Oct. 4, 1967, now U.S. Pat. No. 3,544,758 dated Dec. 1, 1970.

BACKGROUND OF THE INVENTION

This invention relates to a cable apparatus for conducting gas and electricity, and welding wire if desired; and more particularly to such apparatus comprising a flexible cable adapted to be readily and quickly connected to and disconnected from connectible means such as a welding gun, or such as means for feeding into the cable gas, electrical current and welding wire if desired.

For convenience, the invention will be described with reference to gas-shielded consumable electric arc welding, in which use it provides particular advantages, although features of it may be advantageously used in cutting apparatus as well as other types of apparatus embodying flexible cables for conducting electrical current and gas.

In such welding, there is fed into a welding zone in which the welding occurs consumable welding wire that acts as an electrode and is connected to one side of an electrical welding circuit the other side of which is connected to the work to be welded. It is common practice in such welding to surround the welding zone with a shielding gas to prevent extraction from the ambient air of contaminants such as oxygen or nitrogen that have deleterious effect on the metal being welded. The shielding gas may be an inert gas which is helium or argon and preferably is continuously supplied to form a shield or curtain around the tip of the welding wire in the welding zone.

The apparatus heretofore widely used for such welding has embodied a cable through which the welding wire passes and which conducts electric current from the current supply to the welding zone. However, in such apparatus the shielding gas has usually been supplied by a separate hose, usually clipped to such cable and connected to one end to the source of gas and the other end to the welding gun. This hose, being separate from the cable, often tends to become entangled with objects in the vicinity of the welding zone and also is often in the way of the operator and impairs his welding efficiency.

Such prior widely used welding cable also usually has a connector portion at one end, to which the welding head or gun is attached, and a different type connector portion at the other end to which is attached means for feeding the electrode wire to the cable. Usually, the end of the cable near the welding tends to wear most since it is handled by the operator and in service is often dragged over the floor or other support. Consequently, when the cable becomes excessively worn on one end, the usual practice is to cut off the one end of the cable and reattach the severed connector portion to the new unworn end. This is a laborious and time consuming process and inevitably eventually results in a cable that is undesirably short.

Furthermore, in such prior apparatus, the welding gun is usually connected to the end of the cable by cumbersome means that requires considerable time to make a gun change, as is often necessary in welding activities. In such usual prior cable apparatus, moreover, there is no provision permitting rotation of the gun relative to the cable, so welding efficiency is reduced because of difficulty in manipulating the gun when it is immovably attached to the relatively stiff cable.

Structures of cables and guns have been proposed to overcome some of such difficulties. In some cases, proposals have been made to permit a gun to be rotatably mounted relative to the cable, but in general such a gun is not readily removable from the cable, as is often desired in production welding. Furthermore, there are no provisions permitting the gun to be readily locked or secured in a position to which it is rotated since friction is relied upon as the only means to position the gun.

Prior gun constructions have also been efficient in construction and mounting of the welding tip to which the welding wire passes. In prior constructions in general it has been very difficult to remove and replace the welding tip, which usually in time deteriorates due to heat, or which must be replaced to handle a different size of welding wire. Furthermore, in prior constructions it has usually been difficult to remove and replace the gas-confining shield, usually taking the form of a sleeve, around the welding tip. Removal is necessary to permit access to the welding tip so it can be replaced, and to permit replacement of the shield if it deteriorates from heat.

Furthermore, prior constructions have often been deficient in that the welding wire entering the cable has had unremoved dirt or other contaminant particles on it which can cause clogging or abrasion of the passages through the cable or the welding tip and hence impair proper welding.

SUMMARY OF THE INVENTION

An object of the present invention is the provision of apparatus that eliminates as many of the above disadvantages as desired. Another object is the provision of such apparatus in which shielding gas, electrical current, and if desired welding electrode wire, are all passed through the same cable. A further object of the invention is the provision of a cable having at at least one end a connector portion making it possible quickly and easily to connect and disconnect the gun, or other connectible means such as a feeder, to and from the cable, while providing an electrically conductive and gas tight joint between the cable and connectible means. Another object is the provision of such apparatus in which the gun or other connectible means can be rotated relative to the cable, and can be readily secured in any one of a number of rotative positions relative to the cable. Another object is the provision of such apparatus in which the cable has identical connector portions at both ends so that both ends of the cable can be disconnected from the welding gun and from the feeder and the ends of the cable can be interchanged to equalize wear. A further object of the invention is to provide improved gun apparatus. Another is to provide improved feeder means. Another object is the provision of such apparatuses which are durable and can be manufactured at reasonable costs.

BRIEF DESCRIPTION OF THE DRAWINGS

These and other objects and features of the invention will become apparent from the following description of a preferred embodiment in connection with the accompanying drawings in which:

FIG. 1 is an exterior view to a small scale of the apparatus embodying the invention, showing a welding cable of the invention connected at one end to a welding gun and the other end to feeder means for feeding welding wire, shielding gas, and electrical current to the cable;

FIG. 2 is a longitudinal sectional elevation to an enlarged scale, of the gun end of the cable, showing the construction of one of the connector portions, and also the internal construction of a welding gun embodying the invention connected to such connector portion;

FIG. 3 is a section along lines 3—3 of FIGS. 1 and 4, and to the same scale as FIG. 2, of a feeder for feeding the gas, electrode wire, and electrical current to the cable;

FIG. 4 is a section along line 4—4 of FIG. 3;

FIG. 5 is a section along line 5—5 of FIG. 2;

FIG. 6 is a section along line 6—6 of FIG. 2;

FIG. 7 is a section along line 7—7 of FIG. 2;

FIG. 8 is a section along line 8—8 of FIG. 2;

FIG. 9 is a side elevation of the gun, shown as disconnected from an end member of the cable and also shown as having the welding tip and shield disassembled from the gun;

FIG. 10 is a longitudinal sectional elevation of the welding tip;

FIG. 11 is a longitudinal sectional elevation of the shield; and

FIG. 12 is a sectional elevation of an end member of the cable, shown as disassembled from the cable structure as a whole.

DESCRIPTION OF THE PREFERRED EMBODIMENT

The apparatus as shown in FIG. 1 comprises a cable 1 having a central portion 2, welding gun 3 connected to one end of the cable, and feeder means 4 at the other end of the cable. Electrode wire E is fed through the cable by feeder portion 4 and is discharged from the gun 3. Shielding gas is supplied by hose 5 to feeder means 4 and is also discharged through the gun 3. Feeder means 4 is connected by wire 6 to one side of a known electrical energy supply circuit, while the work W is connected by wire 7 to the other side of the circuit. Wires 8 and 9 which pass through a sheath 11 surrounding the central portion 2 of the cable, are connected through switch 12 to suitable known means to control the flow of electricity through the cable and to wire E, and to control the travel of wire E.

As shown in FIGS. 2, 4 and 5, the cable comprises a flexible, resilient, circular-sectioned inner tubular sheath 13 formed of material that is preferably nonmagnetic and electrically nonconductive, such as natural or synthetic rubber, plastic material, or other suitable polymeric material. This sheath preferably seals against passage of gas or moisture.

A flexible electrically conductive circular-sectioned sheath 14 surrounds and supports the inner sheath. Sheath 14 is formed of one or more layers of electrically conductive material, such as copper strand 15, that acts as the electrical conductor; in this embodiment sheath 14 is one layer of strand 15 that is wound in a helix of steep pitch, as shown externally in FIG. 2, each strand being formed of a large number of spirally wound wires of small diameter for increased flexibility.

An outer circular-sectioned sheath 16 of flexible, resilient, electrically nonconductive, nonmagnetic material, such as natural or synthetic rubber, plastic material or other suitable material, surrounds conductive sheath 14, preferably being molded in place over sheath 14 to form a gas and moisture-tight cover.

If desired, as shown in the illustrated embodiment, there may be another external sheath 17 that is loosely slipped over the surface of sheath 16 and is shaped to carry internally the conductors 8 and 9 adjacent sheath 16.

A hollow flexible liner 18 having a passage opening 19 through which electrode wire E passes extends through the inner sheath 15. In this embodiment the liner is formed of a flexible, nonmagnetic, nonconductive wear-resistant synthetic resin material such as nylon, although it could be formed of nonmagnetic metal such as stainless steel. This liner, which is removable, is surrounded by and radially spaced at 20 from the inside wall of sheath 13. As shown in FIG. 5, the interior 19 of liner 18 provides passage for the electrode wire E and a small amount of gas, while the space 20 between the liner and the inner sheath provides an annular space of substantial volume for passage of gas. Sheath 14 conducts the necessary electrical current.

At each end of the cable, there is a connector portion 21 that supports the liner 18, and is connected to the inner sheath 13, conductive sheath 14, and external sheath 16. Each connector portion comprises a member 22 formed of metal of good electrical conductivity, such as aluminum, brass, or copper; it includes a body portion 23 at the extreme end of the cable structure, an intermediate portion 24 of reduced diameter and an end portion 25 of smaller diameter extending toward the cable and separated from portion 24 by shoulder 26. Portion 24 is externally threaded at 27 while portion 25 has an externally threaded tapered end portion 28 that provide external transverse gripping projections.

A nut or sleeve member 29 formed of electrically conductive metal is internally threaded at its front end portion 30 to engage threads 27 of member 22. The remaining inner surface of member 29 is shaped as shown, with an inner ridge 31 of smallest diameter toward the rear of member 29 and followed by a cylindrical internal wall 33 of largest diameter terminating in shoulders 34; the inner surface is completed by a portion 35 having internal transverse gripping projections such as threads defining a smaller diameter than the cylindrical portion, and an outwardly tapered portion 36.

The external surface of portion 23 of member 22, and the external surface of nut member 29 preferably are of hexagonal or other suitable shape providing flat wrench-engagable surfaces.

In manufacture, the cable assembly made up of inner sheath 13, conductive sheath 14, and external sheath 16 has each end preliminarily formed so that sheaths 13 and 14 are of the same length, while sheath 16 is cut back a suitable distance so its end will terminate in the recess defined by wall 33 of member 29 (FIG. 2).

A member 29 is then slid over the external sheath at each end of the cable assembly, with its thread portion 30 facing the free end of the assembly. At each end, the cable assembly of sheaths 13, 14, and 16 is then forced over the projecting portion 25 of a connector member 22 until the end of the assembly abuts shoulder 26, after which portion 30 of member 29 is threaded onto threaded portion 27 of member 22. This causes member 29 in cooperation with member 22 firmly to clamp outer sheath 16 with its exterior surface engaging internal gripping threads 35 and its end extending into the cylindrical annular recess defined by wall 33 of member 29, where it is locked between shoulders 34; to force the inner surface of inner sheath 13 to engage the gripping threads 28 on member 22; and to clamp the end portion of conductive sheath 14 between inner ridge 31 of member 29 and the external surface of inner sheath 13 on portion 25, and also between the portion of outer sheath 16 gripped by recess 33 and threaded portion 35 of member 29 and the portion of inner sheath 13 that is gripped by portion 25 of member 22 and particularly threaded portion 28. Moreover, the portion 35 of member 29 having internal gripping threads engaging sheath 16 overlaps the externally threaded portion 27 of member 22 having external gripping tapered threads engaging sheath 13, to provide added wedging and clamping action that adds great resistance to longitudinal movement of the cable assembly out from connector portion 21.

The ends of the cable assembly, therefore, are firmly anchored in each connector portion 21; moreover, there are large metal-to-metal areas providing conductivity for large electrical currents from the external surface of the conductive sheath 14 to the inner surface of nut member 28, and from the nut member through the threaded joints 27, 30 to member 22.

Furthermore, the construction is such that the cable assembly can be readily disconnected from, or reconnected to, each of the connector members 22.

Each connector member 22 at its free end has a socket recess 38 that is circular in cross section about an axis A substantially coincident with the axis of the cable assembly. The recess decreases in diameter from the free end of member 22 toward the bottom of the recess, the inner surface 39 of the recess being preferably, as shown, frustoconical in shape. The depth of the recess is substantial, being preferably at least as great as, and preferably at least one and a half times, its maximum diameter. An axial opening 40 extends from the recess 38 to the inner end of member 23; it has internal spaced longitudinal ribs 40a (FIG. 12) that locate the liner 18 transversely while permitting gas to flow outside the liner.

Each member 22 also has, near its free end, a threaded opening 41 adapted to receive a setscrew 42 having its axis lying in a plane containing axis A of recess 38. Another threaded opening 43 having its axis in a plane containing axis A and opening into passage 40 also is preferably provided. In member 22 shown in FIG. 2, to which gun 3 is connected, this opening is closed gas-tight by screwplug 44.

At the gun end of the cable 1 there is a handle 45 demountably secured to the exterior of the end structure of the cable. The handle is formed of suitable material, such as hard or synthetic plastic material, having suitable electrical insulating and structural strength properties, that is clamped onto the end portion of the cable structure by bolts and nuts 46. The handle carries a depressable trigger 47 adapted to actuate a switch 48 connected to conductors 8 and 9. At its free end, the handle portion also carries a movable resilient locking member 49, for a purpose to be later described.

The gun 3 shown in FIGS. 1, 2 and 6 to 12 inclusive is a preferred type embodying the invention and may be employed in connection with the above described cable. The gun makes electrically conductive and gas-tight engagement with one of the connector members 22 of the cable, and feeds electrode wire, electrical current, and shielding gas to the welding zone. This gun comprises a suitably curved body 51 of electrically conductive metal such as aluminum, brass or copper, the metal preferably being the same as that of which connector member 22 and nut member 28 are formed. Preferably member 51 is machined at its ends from an extruded blank of suitable cross section, such as that shown in FIG. 7. One end portion 52 of this member is circular in cross section having a diameter decreasing toward its free end; the outer surface 53 of this portion, which is preferably frustoconical, is shaped to fit closely in gas-tight electrically conductive relation with the inner wall 39 of socket recess 38 in the connector member 22 for substantial and preferably the major portion of the length of the recess. As shown, end portion 52 also has an annular groove 54 that is generally tapered in the opposite direction, so that when setscrew 42 is suitably adjusted the screw end, which is preferably smooth and spheroid, slidably bears against the bottom of groove 54 and holds surface 53 of gun portion 52 against surface 39 of socket recess 38 to provide a gas-tight connection and prevent movement of portion 52 in the socket recess longitudinally or transversely of the axis of member 22, while permitting rotation of portion 52 in the socket recess. Mere loosening of setscrew 42 permits portion 52 to be withdrawn from the socket and the gun to be quickly disconnected from the cable.

The other end of body member 51 has external threads 55.

While the external cross sectional shape of the gun body 51 may be circular or of other shape, it is preferably generally elliptical as shown in FIG. 7, with the major axis of the ellipse generally parallel to the axis about which the gun body as a whole is curved. Such an external shape, together with curvature of the body as a whole, makes it easier to grasp the gun body during welding, or for removal or replacement of the gun, preferably, as shown, the member has a large cross sectional area of metal throughout its length, for high electrical conductivity.

Preferably, gun body member 51 has spaced extruded or machined longitudinally extending ribs 56, 57 (FIG. 7) spaced laterally around the body by longitudinally extending grooves 58, 59. Member 51 also carries an external flexible sheath 61, preferably formed of silicone rubber or the like, which is heat-resistant, electrically insulating, and provides a good grasping surface. Sheath 61 conforms to the generally elliptical shape of the gun body and moreover forms with the grooves 58, 59 passages between the sheath and the ribs. The sheath stops sufficiently short of the ends of the gun body to cause the passages to have open ends. Air may flow by convection through these passages to cool the member 51 and prevent uncomfortably warm temperatures to the hand.

Gun body member 51 has an internal axial through opening 62 that preferably (FIGS. 2, 6 and 7) having internal ribs 63 spaced by grooves 64 of substantial areas, for passage of shielding gas around the liner. The inner edges of the ribs define an opening sized to fit closely about a tubular inner liner 65, preferably formed of heat-and-wear-resistant metal such as stainless steel. Liner 65 has a central opening 66 through which wire E passes. The ribs and passages provide extended heat transfer surfaces that make it possible for the shielding gas to remove considerable heat from, and cool, the liner and member 51. One end of the gun liner terminates within member 51 at the portion that projects into connector socket recess 38, and at the end of the cable liner 18 that also projects within the gun body opening 62. The other end of liner 65 is slotted transversely, preferably with two or more deep slots 67, and the portions between the slots are expanded transversely to provide resilient outwardly biased fingers 68, the innermost ends of the slots terminating in an unexpanded portion of the liner to enable gas to flow from outside the liner to its inside when the liner end is in a welding tip. The outer surfaces of the extreme ends of fingers 68 are also tapered inwardly at 69 as shown to facilitate mounting of a welding tip.

At its outlet end gun member 51 has a generally cylindrical axial recess 71, formed by cutting ribs 63 a substantial distance back from the free end of the member.

A welding tip 72 formed of copper or other metal having desirably high electrical and heat conductivity, is demountably held in recess 71. The welding tip shown in FIGS. 2, 8 and 10 has a larger rear portion 73 of generally cylindrical external shape, and a front generally cylindrical portion 74 of smaller external diameter. The rear portion is sized to fit snugly into recess 71. Tip 72 also has an opening 75 axially extending throughout its length, the rear portion 76 of which is enlarged and sized to fit with a press fit over the expanded fingers 68 of the liner 65, while the front portion 77 of the tip opening is smaller and is sized to provide a sliding fit with, and good electrical conductivity to, the welding wire E used. Tip 72 also has several transverse openings 78 from the inner end of larger opening 76 to the exterior.

The welding tip can be readily inserted into recess 71 and be firmly but demountably held in place (FIG. 2) by the inner wall of the recess and the press fit of the fingers 68 on the interior surface of the tip opening portion 75, transverse openings 78 being located beyond the end of gun member 51 so they communicate with the tip exterior.

A bushing 80, formed of suitable heat-resistant electrical insulating material having considerable structural strength such as a thermoset phenolic resin, is threaded by internal threads onto external threads 55 on discharge end of the gun member 51. This bushing has at its rear end an enlargement 81 protecting the entrances to the external cooling passages of the gun, and at its front end is turned inwardly to provide a stop 82 to locate the bushing axially. The outer surface of the bushing has a groove carrying a split retainer ring 84 formed of spring metal.

A tubular shield or nozzle 85 formed of suitable material such as copper having good heat-resistant and conducting properties, has an internal size such that it can be slipped onto bushing 80 and held in place by pressure of the retainer ring 84 against the sleeve inner wall. The shield is preferably long enough to extend somewhat beyond the end of the welding tip.

The construction is such that the shield is held firmly in place during use, but can be readily slipped off as required merely by an axial movement, without the necessity of unscrewing it or removing locking screws or rings or the like. The welding tip similarly is held firmly in place during use but can be readily removed by merely sliding it on axially from the press fit that holds it in place. A new welding tip can be readily inserted, and the shield can be replaced, all within a very short time, merely by pushing them back in place.

The locking member 49 on the cable can engage any one of several grooves between ribs on the exterior of the body member 51 of the gun to prevent it from rotating; however, when the locking member is disengaged from all grooves by mere pressure of the finger on the resilient locking member to move it toward tne end of the cable the gun can be rotated into any one of a wide range of anulgar positions relative to the axis of the connector portion 21 and to the cable, after which the locking member can be released to engage with the adjacent groove. Thus it is possible readily and quickly to move the gun to an angular position most desired for welding, and readily to secure it there.

The feeder means 4 of the illustrated apparatus, shown in detail in FIGS. 3 and 4, comprises a connector member 22 that is identical with the member 22 at the other end of the cable and that is connected to the cable assembly made up of inner sheath 13, conductive sheath 14, and outer sheath 16 in the manner identical to that described above, through use of an identical nut member 29. A bracket 86 closely fits around member 22 and provides a connection for welding current wire 6. The bracket is secured by a threaded conduit 87 extending through the bracket into opening 43 of member 22. Gas supply hose 5 is connected to this conduit, and supplied gas to the inner passage 40 of the member 22. Liner 18 extends into such passage to the end of socket recess 38. Gas then can pass from the hose 5 to the space between passage 40 and the liner, through space 20 between the liner 18 and inner sheath 13, thence into the space in the gun between the liner 65 and opening 62 in gun member 51 and out through the welding tip as described above into the space between the tip and shield 85.

An electrode wire feed member 88, shown as inserted into socket 38 of member 22, has a tapering surface that fits closely against the inner surface of the socket. This member also has a groove 89 identical with groove 54 of the gun. A setscrew 90 threaded into opening 41 of member 22 may be used to lock member 88 in the socket and if desired, permit relative rotation between members 22 and 88. Member 88 has an internal liner 91 suitably secured.

A washer 92, preferably or felt or other suitable resilient fibrous material, having a central opening, and if desired another apertured washer 93 formed of resilient rubber or the like to exert pressure on washer 92, are located between the bottom of socket 38 and the bottom of member 88. The washers, particularly the felt washer, wipe the wire passing from member 88 into the liner 18 to clean it of dirt particles or dust that could cause clogging or undesired abrasion to the apparatus. The washers also prevent gas leakage outwardly through the bottom of socket 38 or along the wire.

The apparatus described has the following advantages, among others. Complete relative rotational movement is permitted between the cable and the welding gun, and if desired between the cable and the feeder, and the gun can be easily positively secured in a desired rotational position relative to the cable. Both the feeder and the gun are held and prevented from movement longitudinally relative to the cable.

Despite such permitted relative rotation movement, there are completely gas-tight joints and excellent electrical contacts between the feeder and the conductive sheath through the cable, and between the conductive sheath and the conductive portions of the gun to the welding tip of the gun. The welding gun can be readily and rapidly disconnected from the cable merely by loosening set screw 42, and pulling longitudinally of the cable. Similarly, it can be reconnected by inserting its end in the socket 38 and suitably adjusting setscrew 42. The feeder member 88 can be similarly handled.

The extended heat transfer surfaces on the outer and inner surfaces of the body member of the gun making possible air cooling along the outer portion of the gun and the gas cooling inside the gun and at the welding tip, provide a gun that is comfortable to the touch and more resistant to heat deterioration. In the gun disclosed there cannot be an electrical short between the shield and the welding tip since all exterior portions of the gun are completely electrically insulated from the welding tip and from all other portions of the gun that conduct electricity. Heat from the shield at the welding end of the gun cannot be conducted back to the rest of the gun as the sleeve is heated because the shield is heat-insulated from the remainder of the gun. The only portions of the gun that can deteriorate are the welding tip and the shield, both of which can be replaced with ease and at low cost. Therefore, much less of the gun need be replaced than in conventional guns.

The gun can be connected to and disconnected from the cable without disassembling the gun or the cable. The connector members of the cable can be readily assembled to or disassembled from the cable without the need of welding or cutting or other complicated procedures, and the feeder portion can be connected or disconnected to the cable without difficulty. If necessary these end portions can be readily removed and reassembled on other cables or on opposite ends of the same cable.

It is apparent that various modifications may be made in the illustrative apparatus without departing from the spirit of the invention. It is intended that the patent shall cover by suitable expression in the claims, the features of patentable novelty that reside in the invention.

What is claimed is:

1. In a welding gun having a handle portion and a nozzle portion connected to said handle portion by an elongated metal body having an inlet end connected to said handle portion and an outlet end connected to said nozzle portion, said handle portion including means to connect said handle portion to a source of electrical current and a source of shielding gas for supplying electrical current and shielding gas to said nozzle portion through said body, the improvement in said elongated body comprising, a first passage extending longitudinally through said body, means for removably connecting the inlet end of said body to the handle portion to conduct electrical current through the body and conduct shielding gas form said handle portion through the first passage, means at the outlet end of said body to discharge gas and means to conduct electrical current to said nozzle portion, means carried by said body providing an outer surface over said body and cooperating therewith to provide at least one second passage between the surface of said body and the means providing the outer surface and extending for a major portion of the length of said body, said at least one second passage being independent of said first passage and having an inner heat transfer surface defined by and forming part of said body, and means providing a first opening at the inlet end of said body and a second opening at the outlet end of said body to define with said at least one second passage a continuous opening to provide cooling of said body and said outer surface by convection air flow through said first and second openings and said at least one second passage.

2. The gun of claim 1 wherein said at least one second passage comprises a plurality of said second passages between said body and said means providing said outer surface, each of said second passages having said inner heat transfer surface and communicating with the atmosphere through said opening spaced longitudinally of said body to permit air to pass through each of said second passages from one of said openings to the other of said openings in contact with said inner heat transfer surface of said passage to cool said body and said means providing said outer surface.

3. The gun of claim 2 in which said body is formed with external ribs thereon separated by grooves, and in which said means on said body providing said outer surface of said gun is a tubular member mounted on said body and contacting the outer edges of said ribs, said grooves and said tubular member cooperating to form said second passages, and said inner heat transfer surfaces comprising the surfaces of said grooves.

4. The gun of claim 1 in which said first passage through said body has internal ribs extending laterally and axially of said body in said passage, and which gun comprises a tubular liner within the space defined by the inner edges of said internal ribs, said liner having a longitudinal opening extending through said liner and providing a third passage through which welding wire may pass in use of said gun, and means for passing said shielding gas through said first passage in the space between said internal ribs and said liner.

5. The gun of claim 1 wherein said nozzle portion comprises a bushing formed of heat resistant electrically non-conductive material fixed to said outlet end of said body, a shielding sleeve that is demountably held on said bushing, and resilient snap-ring means operating between said bushing and said sleeve to demountably hold said sleeve on said bushing.

6. A welding gun adapted to be connected to means for supplying gas comprising a rigid elongated body having a passage for gas extending longitudinally through the body, said body having at one end constituting its inlet end means for connecting said body to said means for supplying gas so that gas will pass into and through said passage, said body having at its other end constituting its outlet end a recess in which said passage terminates, a tubular liner in said passage having an end portion of said liner that is spaced from the inner wall of said recess of said body and has radially sprung fingers in said liner end portion, and a welding tip in said recess of said body that is held in place in said recess by press-fit of said radially sprung fingers of said liner outwardly against said welding tip.

7. The gun of claim 6 in which said liner and said passage are so cross-sectioned that there is a space between the outside of said liner and the inside of said passage through which gas may pass, and in which said welding tip is tubular and said liner extends within said welding tip and is apertured to permit gas to pass from said space in said passage outside of said liner into the inside of said end portion of said liner and from thence into the inside of said welding tip from which it discharges adjacent said outlet end of said body to permit said gas to act as shielding gas and cooling gas for cooling said welding tip.

* * * * *